June 11, 1968  F. C. STEDMAN  3,387,759
WIRE FEEDING MEANS
Filed Feb. 24, 1967  2 Sheets-Sheet 1
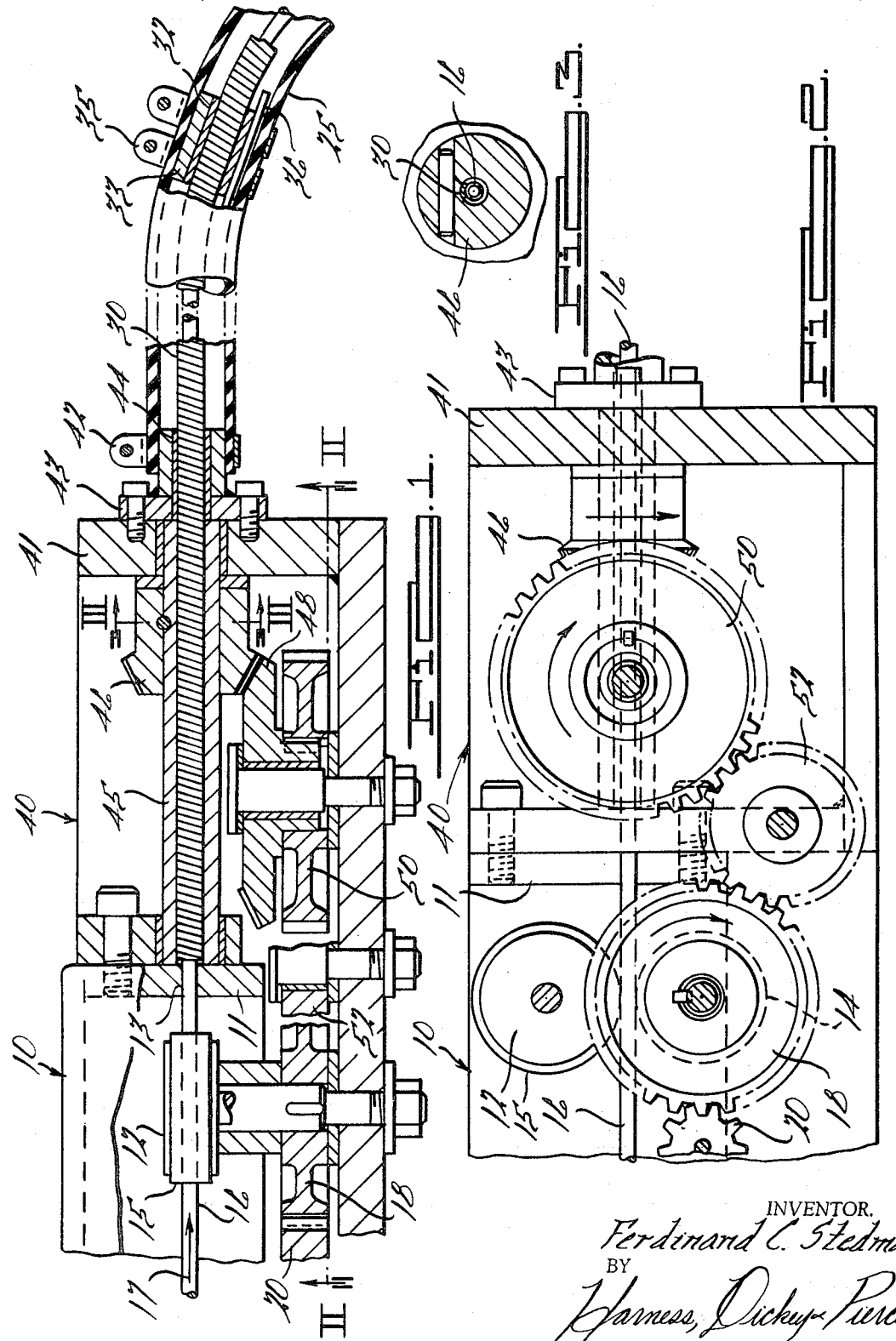
INVENTOR.
Ferdinand C. Stedman
BY
Harness, Dickey & Pierce
ATTORNEYS

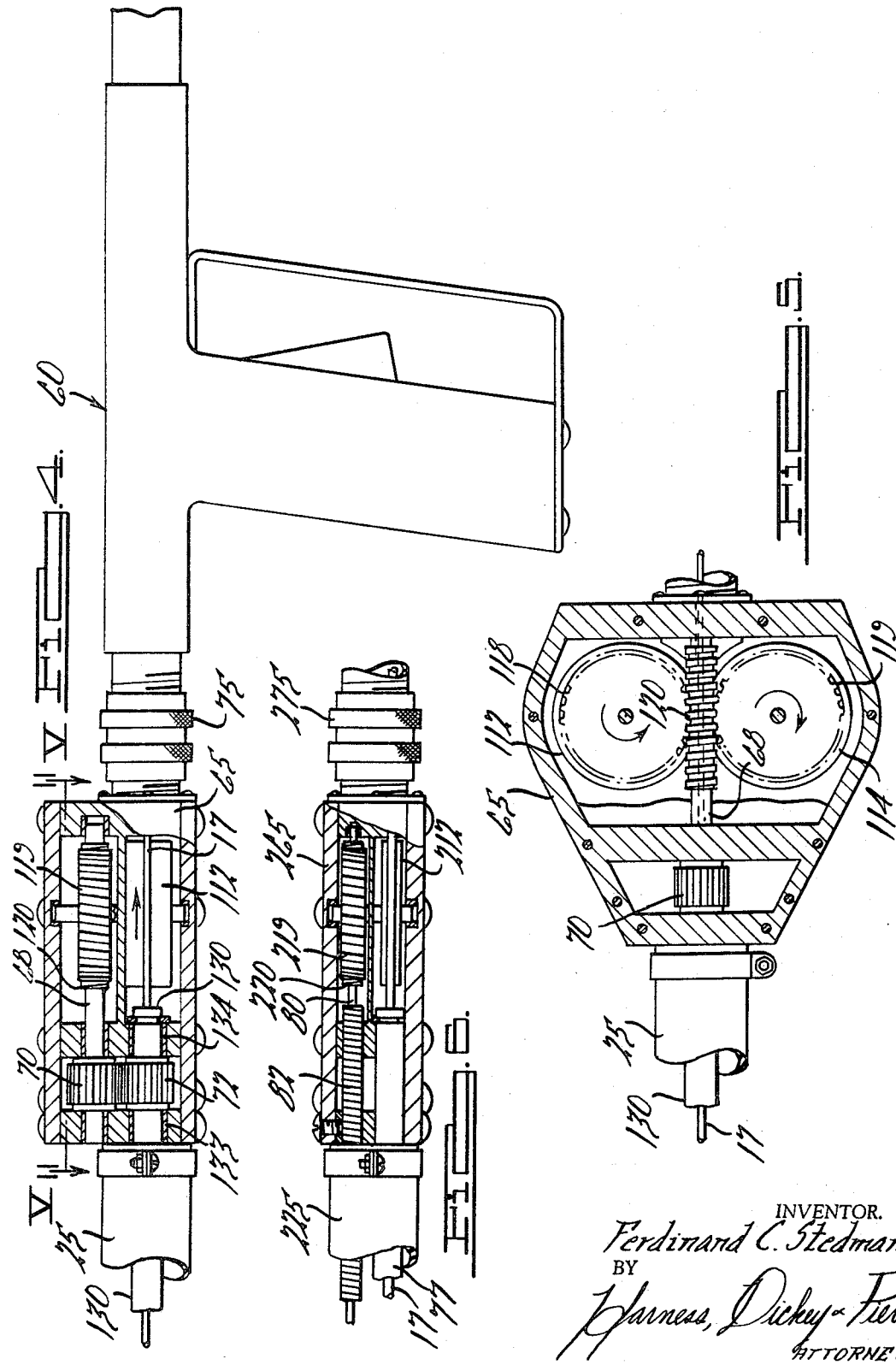

3,387,759
WIRE FEEDING MEANS
Ferdinand C. Stedman, 24605 Blackmar Drive,
Warren, Mich. 48091
Continuation-in-part of application Ser. No. 579,879,
Sept. 16, 1966. This application Feb. 24, 1967, Ser.
No. 632,128
12 Claims. (Cl. 226—108)

ABSTRACT OF THE DISCLOSURE

In order to enable pushing a flexible wire through a bendable conduit with reduced friction and binding, the conduit includes a Bowden sheath which is rotated about its longitudinal axis in the conduit as the wire is fed therethrough. The helix angle of the wrapping of the Bowden sheath assists in feeding the wire. The power for rotating the sheath is derived from the same source which drives the feed rollers which exert pushing force on the wire. The disclosure also shows feed rolls for exerting a pulling force on the wire at the remote end of the sheath, such pulling rolls being either used to supplement the push-action feed rollers, and powered by the rotation of the sheath, or employed as the sole actuating agency, and powered by a conventional rotary cable drive.

---

This application is a continuation-in-part of my previously filed copending application, Ser. No. 579,879, filed Sept. 16, 1966, now abandoned.

Brief summary of the invention

The present invention relates to means for mechanically feeding wires through flexible conduits, and particularly to improved means for reducing the tendency of wire to bind and to resist advancing movement when pushed through a curved flexible conduit.

The invention has particular utility in connection with electric welding operations of the type where a welding wire is continuously fed through a conduit to a welding gun. Typically the conduit also contains a cable carrying the electric current for the welding operation, as well as a tube carrying inert gas, and various control wires. In order that the gun may be as light and maneuverable as possible, the means for driving the welding wire is preferably of the push-type and located at the end of the cable remote from the gun. With constructions heretofore used, difficulty is encountered due to the tendency of the wire to bind, particularly where the wire is relatively thin and/or soft, where the conduit is relatively long in proportion to the wire diameter, and where extensive bending or bends of relatively short radius are required.

The present invention overcomes difficulties of the indicated character, even under severe operating conditions, and permits feeding the wire with less power and less frictional resistance under conditions not heretofore surmountable with feeding means of the push-type.

In the drawing:

FIGURE 1 is a horizontal sectional plan view of wire feeding means constructed in accordance with the present invention, partly broken away;

FIGURE 2 is a vertical sectional view taken substantially on the line II—II of FIGURE 1 and looking in the direction of the arrows;

FIGURE 3 is a sectional detail taken substantially on the line III—III of FIGURE 1;

FIGURE 4 is a view partly in vertical section and partly in side elevation showing supplemental feed means employed in certain applications of the invention;

FIGURE 5 is a sectional view taken substantially on the line V—V of FIGURE 4 and looking in the direction of the arrows, and FIGURE 6 is a fragmentary view of a modified supplemental driving mechanism.

Referring now to the drawing, reference character 10 designates generally a casing, which is only partially illustrated and which is presumed to be the casing of a wire feeder of a type well known in the arc welding industry and within which are journaled a pair of feed rollers 12, 14 disposed on vertically spaced parallel horizontal axes and having soft tread portions as 15 which are adapted to grip and positively drive a wire as 16 in the direction indicated by the arrow 17 in FIGURE 1. The rolls are rotatable by suitable driving means, shown as comprising a gear 18 fast with respect to roll 14 and driveable by a pinion 20 which is in turn driveable by known means, not shown, which may comprise an electric motor and suitable speed controlling means. When the rolls are rotated in the indicated manner they pull the wire 16 from a reel or other supply source (not shown) positioned at the left, as the parts are illustrated, and push it to the right. The wire feeding apparatus thus far described is conventional, and in usual practice the right wall 11 is the end wall of the casing, and a conduit corresponding to the conduit 25 is ordinarily coupled to the wall 11 in registry with the outlet hole 13 through which the wire 16 is conducted. It has been customary to provide a fixed flexible sheath for the wire within the conduit, usually formed of plastic and through which the wire is pushed. A clutching effect and high friction arise between the outer part of the wire and the inner surface of the sheath in each curved area encountered by the wire, where the wire is thus pushed through such a known type of assembly, and these resistances to movement of the wire increase rapidly as the number of curves is increased and/or radius of curvature decreased, and as the ratio of conduit length to wire diameter is increased, and also as the stiffness of the wire is decreased.

I have found that it is possible to substantially eliminate binding and objectionable friction by providing within the conduit 25 a sheath 30 which is rotated about its axis as the wire is fed. Preferably the rotatable sheath incorporates on its inner surface a helical configuration which assists in feeding the wire, although a very substantial benefit is attained with a smooth sheath so that in many applications the helical configuration can be dispensed with. As shown in FIGURE 1, the sheath 30 may comprise a conventional Bowden wire sheath having a left hand helix and which is formed of stiff steel wire wound in tight convolutions. The sheath 30 is suitably journaled in the conduit 25 for rotation about its own axis and for this purpose is supported throughout at least a portion of its length in suitable bearing material, such as nylon or Teflon bearing means, which may comprise either a continuous tube or individual bearing sections. In the construction illustrated in FIGURE 1, only two plastic bearing portions, 32, 44 are shown, but as will be understood, any number of these may be provided at suitably spaced intervals along the length of the conduit, as may be required to effectively journal the sheath. Bearing portions which are spaced from the ends of the conduit, such as the bearing portion 32, are carried by a supporting block 33 fitted into the conduit and located by clamp means 35 secured upon the outside of the conduit and constricting the latter to frictionally grip the block and so retain the bearing in position. The bearing blocks 33 are preferably of spider section to permit other elements such as the control wire 36 to by-pass them.

A supplementary casing portion 40 is secured to the end wall 11 of casing 10, forming an extension thereof, and the conduit 25 is fixedly attached to the right end wall 41 of casing portion 40 as by suitable clamping and coupling means 42, 43. The sheath 30 projects from the end of the conduit through the bearing portion 44 into the interior of casing 40 and within the casing is fast in a hollow shaft 45 journaled in the casing. A bevel gear 46 on shaft 45 meshes with a bevel gear 48 driveable in timed relation to the feeding rolls 12, 14 through suitable gearing shown as comprising a gear 50 fast with respect to bevel gear 48 and an idler 52 meshing therewith and with the gear 18. The direction of rotation of these elements is such that as the feed rolls are turned in a direction to advance the wire through the sheath and conduit, the sheath is rotated in the conduit in a direction such that the helically disposed convolutions on the inner surface of the sheath have a screw effect exerting a frictional driving effort on the wire in the same axial direction.

The rotation of the sheath eliminates static friction which causes the wire to bind under ordinary conditions, and if the Bowden-type or helical sheath is employed it also provides a frictional driving force.

Not only does the invention make it possible to feed wire which is longer and/or more flexible than could be pushed through a curved flexible conduit without the use of my invention, but a more uniform rate of feed is more easily attained because of the reduced tendency for the wire to stick against the interior of the conduit along the outer surfaces of curved portions.

An important use of invention is in connection with the feeding of welding wire to portable welding guns. If the conduit 25 and contained components are employed for such purpose, a continuation thereof toward the right, as viewed in FIGURE 1, will terminate at a welding gun, corresponding to the welding gun generally designated 60 in FIGURE 4. The gun is ordinarily attached to the right end of the conduit 25 and employed in the usual manner for continuous wire feed type electric arc welding.

In modern practice it is frequently desirable to employ welding wire of very small size, and which is relatively soft. Diameters as small as 1/64 inch are sometimes desirable. Under such difficult circumstances, where the wire is small and/or soft, and the conduit or distance to be traveled is relatively long, I have found it desirable to further modify the feeding means by employing in addition to the above described means a wire pulling assembly, as shown in FIGURES 4 and 5, at the remote end of the conduit 25. Supplemental feed rolls 112, 114 are contained in a casing 65 which may be located at and rigidly connected to the gun 60. The feed rolls 112, 114 are provided with a soft surface adapted to grip the welding wire 17 and are rotatable in a direction to tend to pull the wire from the Bowden sheath 30, and push it into the welding gun, by means of worm wheels 118, 119. Worm wheels 118, 119 are fast with respect to rolls 112, 114 respectively and driveable by a worm 20 mounted on a shaft 68 journaled in the casing 65 parallel to the path of the wire 17. Shaft 68 has a spur gear 70 fast thereupon which meshes with and is driveable by a spur gear 72 fast upon and driveable by the sheath 130 within the casing. As shown in FIGURE 4, sheath 130 projects into and is suitably journaled in the casing 65 as in smooth bearings 133, 134.

The sheath 130 may be a smooth plastic tube which is bendable but stiff enough to effectively transmit substantially uniform torque to the driving means for rolls 112, 114, and the pulling effect of such rolls overcomes any tendency of the wire to bind in the conduit, even under the most extreme conditions. The rotation of the tubular plastic sheath 130 effectively reduces friction and the plastic is also an electrical insulator, so that no further insulation is required to protect the welding wire from electrical contact with elements in the conduit. It will be understood that in such welding applications the other lines required in the welding operation although not shown in the drawing, may simply by-pass the supplemental drive assembly. The supplemental drive assembly can be constructed of light weight materials, is compact, and does not add materially to the weight or maneuverability of the gun, to which it is rigidly but separably attached by a screw coupling 75. It will be appreciated that the supplemental drive means need only be employed where the service conditions are so severe as to require it.

A modified type of drive which may be either as a supplemental drive like the unit of FIGURES 4 and 5, or which may be employed as the only drive for the welding wire, is shown in FIGURE 6. In this embodiment which is also designed for rigid attachment to the welding gun by a coupling 275, the welding wire 17 is conducted through a non-rotary plastic tube 77 in accordance with present practice. Within the housing 265 are drive rolls 212, which engage the welding wire on both sides and drive it similarly to the rolls 112, 114 previously described. Rolls 212 are driven by worm wheels 219, corresponding to worm wheels 118, 119 and meshing with opposite sides of, and driven by, a worm 220. Worm 220 is fast on a Bowden wire 80 which is rotatable in a Bowden sheath 82, wire 80 and sheath 82 being entirely separate from welding wire 17 and its tube 77. The cable drive assembly 80-82 extends through the conduit 225 to a desired source of power along with the other components within the conduit, as for example to the power unit for the welder, which is equipped with a suitable drive such as a speed-controlled electric motor for rotating the wire 80 and so driving the rolls and the welding wire at a desired speed. Depending upon the service conditions it may not be necessary to employ push-type driving rolls at the inlet end of the conduit, such as the rolls 14, 15 of FIGURE 1, when pulling rolls are employed as in the embodiments of FIGURES 4-6.

The foregoing portions of this disclosure and the appended drawings are furnished in compliance with the requirement of the law to set forth the best mode contemplated by the inventor of carrying out his invention, and changes may be made in the preferred embodiments disclosed without departing from the fair and proper scope of the appended claims.

What is claimed is:

1. Means for feeding a filamentary member through a flexible conduit comprising a flexible inner sheath rotatably fitted within the conduit and having unobstructed inlet and outlet ends and through which a filamentary member is adapted to be pushed, and means for rotating the inner sheath about its longitudinal axis.

2. Means as defined in claim 1 wherein the interior of the sheath is provided with surface irregularities forming bearing surfaces for the filamentary member.

3. Means as defined in claim 1 wherein the interior of the sheath is provided with helically diposed surface irregularities forming bearing surfaces for the filamentary member.

4. In combination with means as defined in claim 1 wherein the filamentary member is a welding wire and a welding wire feeder including rotary gripping-type drive rollers for pushing the wire, the novelty which comprises means operatively interconnecting said means for rotating the sheath with said rolls for driving the sheath in timed relation to the rolls.

5. Means as defined in claim 1 wherein said sheath is of the Bowden wire type, and means rotatably journaling the sheath in the conduit.

6. In combination with means as defined in claim 5 wherein the filamentary member is a welding wire and a welding wire feeder including rotary gripping-type drive rolls for pushing the wire, the novelty which comprises means operatively interconnecting said means for rotating the sheath with said rolls for driving the sheath in timed relation to the rolls.

7. In combination with means as defined in claim 1, wire pulling means at the outlet end of and driven by the sheath.

8. A combination as defined in claim 7 wherein said wire pulling means comprises a pair of gripping-type drive rolls.

9. In combination with means as defined in claim 6, wire pulling means at the outlet end of and driven by the sheath comprising a pair of gripping-type drive rolls and a casing secured to said conduit enclosing said last-mentioned rolls, said sheath terminating in said casing and being rotatably journaled therein.

10. In combination with a welding gun of the electric arc type designed for utilization with elongated welding wire which is fed thereto through a flexible conduit, means for feeding welding wire to the gun comprising a roller-type feed unit, means for rigidly attaching such unit to the gun at a position between the gun and the conduit, and a flexible elongated rotary drive member in the conduit connected to the feed unit to actuate such unit.

11. Means as set forth in claim 10 wherein said drive member surrounds the welding wire.

12. Means as set forth in claim 10 wherein a flexible tube in the conduit surrounds the welding wire, and a separate flexible tube surrounds said drive member.

References Cited

UNITED STATES PATENTS

| | | | |
|---|---|---|---|
| 2,223,005 | 11/1940 | Kerber | 214—338 X |
| 3,123,702 | 3/1964 | Keidel et al. | 219—130 X |

ALLEN N. KNOWLES, *Primary Examiner.*